Figure 1:
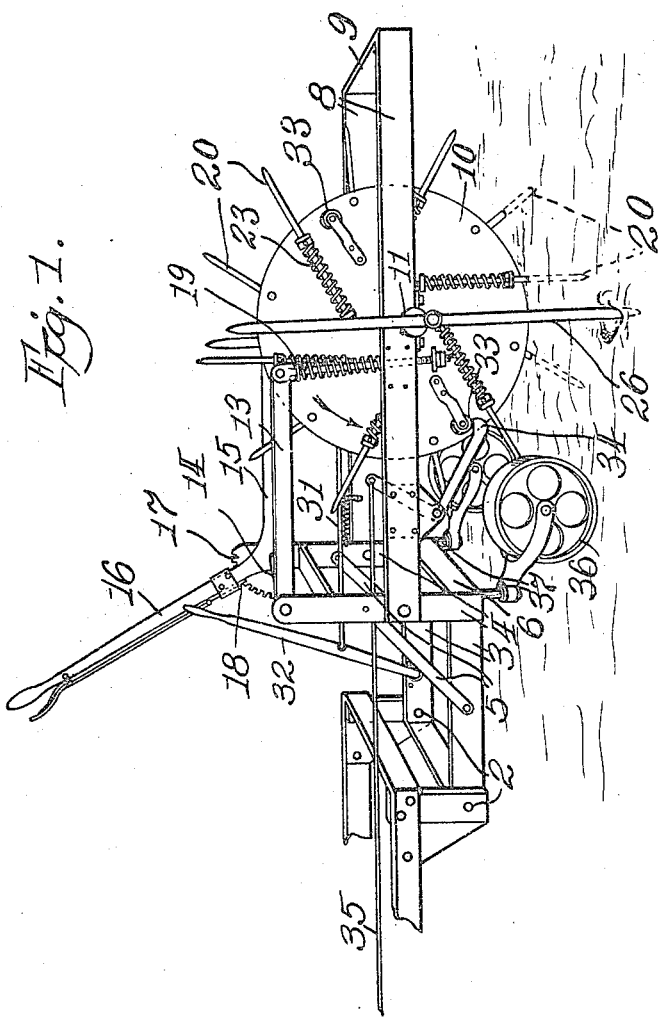

J. WASEM, DEC'D.
M. WASEM, ADMINISTRATRIX.
CORN PLANTER ATTACHMENT.
APPLICATION FILED SEPT. 13, 1915.

1,256,083.

Patented Feb. 12, 1918.
2 SHEETS—SHEET 1.

Inventor:
Jacob Wasem Deceased
Mary Wasem Administratrix,
by: C. D. Enochs
Attorney.

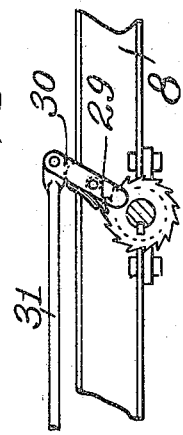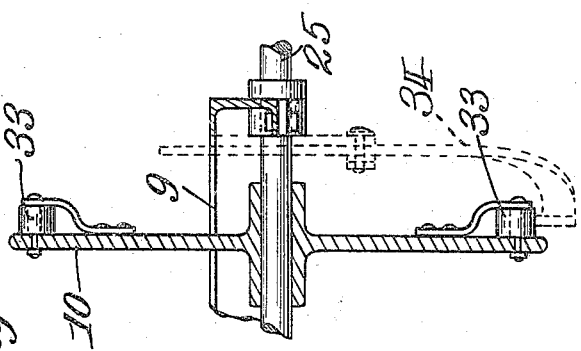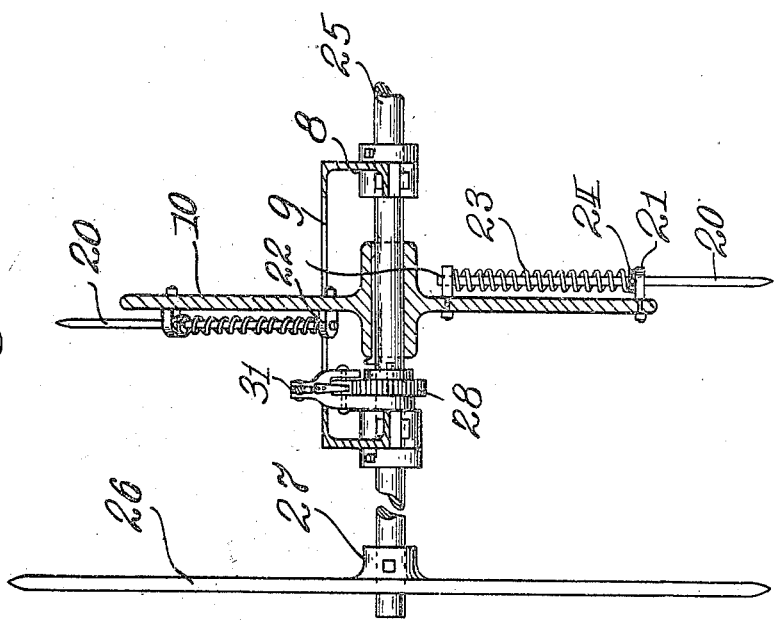

UNITED STATES PATENT OFFICE.

JACOB WASEM, DECEASED, LATE OF TOWER CITY, NORTH DAKOTA, BY MARY WASEM, ADMINISTRATRIX, OF TOWER CITY, NORTH DAKOTA.

CORN-PLANTER ATTACHMENT.

1,256,083.  Specification of Letters Patent.  Patented Feb. 12, 1918.

Application filed September 13, 1915. Serial No. 50,503.

*To all whom it may concern:*

Be it known that MARY WASEM, a citizen of the United States, residing at Tower City, North Dakota, in the county of Cass, is the administratrix for JACOB WASEM, deceased, who, when living, was a citizen of the same, and who invented new and useful Improvements for Corn-Planter Attachments, of which the following is a specification.

An object of the invention is to provide a simple inexpensive and efficient attachment designed for use with various types of corn planters, and adapted to dispense with the use of the wire ordinarily employed to operate the dropping attachment of the corn planter.

A second object of the invention is to provide an attachment of this type wherein the driver will not need to leave his seat on the corn planter with which it is being operated when he is making a turn and starting a new row.

A further object of the invention is to provide an attachment for corn planters having a marking wheel that will accurately operate the dropper in the corn planter at regular intervals, and, furthermore, mark the dropping points of the following row.

Another object of the invention is to provide a number of spring-mounted prongs adapted to engage in the soil successively as the operating wheel of the attachment travels along the surface of the ground, the spring mounting being such as to obviate the possibility of any of the prongs being broken if they should strike a boulder embedded in the earth.

The final object of the invention is to mount the operating wheel and its attendant mechanism under spring tension so the wheel may readily follow unevenness in the land, and means is also provided for increasing or decreasing the spring pressure on the wheel, and also means for lifting the wheel and prongs clear of the soil. Further means are provided for adjusting the marking points, also operated by the wheel, to correspond with the points in the rows planted previously where the corn has been dropped.

Reference to the drawings which form a part of this specification, discloses in Figure 1 a perspective view of the attachment as embodied in one form of construction. Fig. 2 is an enlarged front view, partly in section, of the operating wheel and the prongs, with a portion of the shaft 25 broken away; while Fig. 3 is an enlarged view of the means used for setting the prongs in respect to the points at which the corn has been dropped in preceding rows, so as to set the marker properly. Fig. 4 is an enlarged view, partly in section, of the operating wheel and the rollers mounted thereon, which serve to trip the operating mechanism of whatever corn planter the mechanism is connected with.

Pivotally mounted on the frame 1 of any type of corn-planter at 2 the frame of the attachment consists of the rigid double L shaped frame made up of the members 3, 4, 5, 6, and 7, and pivotally mounted thereon, the rectangular frame consisting of the members 8 and 9, carries the operating wheel 10, journaled in the members 8 at 11. Pivotally mounted at 12 is a substantially U shaped frame consisting of members 13, 14, and the member 15 which has rigidly attached thereto, or an integral part thereof, the lever 16 which by means of the quadrant 17 rigidly attached thereto to the member 4, and dog 18 determines the downward pressure on the members 8 of the springs 19, and also serves when drawn downward to the fullest extent to lift the frame carrying the operating wheel with its prongs 20, clear of the earth.

The operating wheel 10 carries the prongs 20 which are loosely supported by the collars 21 and 22, Fig. 2; the prongs being held extended outwardly from the periphery of the wheel by the action of the spring 23 on the collar 24 which is rigidly attached to the prong.

The shaft 25 to which the wheel 10 is keyed, also carries the markers 26 which may be adjusted angularly by the set screws 27.

Keyed to the shaft 25 is a ratchet wheel 28 which is adapted to be actuated by the dog 29 through the link 30, rod 31, Fig. 3, and hand lever 32, Fig. 1.

The rollers 33, carried by the wheel 10, are adapted to engage with the trip lever 34 twice in each revolution of the wheel 10, and thus through the rod 35 operate the dropping mechanism of whatever corn planter the attachment is connected with.

The wheels 36 are adapted to carry the weight of the attachment, and are mounted on the trunnion bearing in the frame of the attachment at 37.

When the attachment is connected with any suitable type of corn planter and is drawn along the field in which the corn is to be planted, the lever 16 is set in such position as to give the desired pressure on the prongs 20, pressing them into the earth and, as the attachment moves forward the embedding of these prongs in the earth will rotate the wheel 10, there being at all times three prongs embedded in the earth to prevent slippage of the wheel 10 and inaccurate planting. The turning of the wheel 10 in an anti-clockwise direction carries the rollers 23 with it and twice in each revolution of the wheel the dropping mechanism of the corn planter will be operated by the lifting of the trip lever 34 by the rollers 33.

The markers 26 being set in a suitable position on the shaft 25 will twice in each revolution tear a small hole in the soil which will check accurately in a transverse direction to that which the planter is moving, with the points at which the corn has been dropped in preceding rows.

When a row has been completed, the operator will shut off the dropping attachment in the corn planter in the usual manner, but allow the attachment to move forward so the markers 26 will make one or two additional marks in the soil, make his turn with the planter and attachment and start back on the succeeding row.

When he reaches the point at the beginning of the succeeding row, where the marker has made the hole for lining up the new row, he may then by operating the hand lever 32 rotate the wheel 10 which had been lifted from the earth by the lever 16 immediately after the last holes were made by the markers, so that marker 26 corresponds with the hole which the other marker had just previously made. The operator will then lower the wheel 10 by means of the lever 16 so the spring tension of the spring 19 is such as to embed the points 20 into the ground a suitable amount, release his corn dropping mechanism in the corn planter and proceed with the following row.

Both levers 16 and 32 are so arranged that they may be readily reached from the ordinary type of corn planter when the attachment is connected thereto.

He was aware that attachments had been made for corn planters wherein the dropping mechanism of the planter was operated by the rotation of a wheel in the attachment and, therefore, does not claim the idea broadly, but believes his invention to be entirely new and novel in the manner in which the operation is accomplished, and believes he is entitled to patent protection within the scope of the following claim:

He claims:—

A rotary marker device for actuating the rock shaft of a corn planter, comprising a rectangular frame pivotally mounted at the rear of the planter frame, caster wheels for supporting said rectangular frame, an auxiliary U-shaped frame pivoted to the rectangular frame, an axle mounted in the U-shaped frame, a marking rod non-rotatably mounted at one end of said axle, a traction disk mounted at the middle of the axle and having spring pressed ground engaging prongs thereon, said prongs being spaced from and parallel to diameters of the disk, an elevating and depressing means for said U-shaped frame, a bell-crank lever pivoted on the U-shaped frame, a rod connected to one end of said lever and extending forward for attachment to the rock shaft of a planter, rollers mounted on the disk for actuating said bell crank lever, a ratchet wheel non-rotatably mounted on the axle, and manually operated means for rotating said ratchet wheel and axle when the U-shaped frame is elevated.

MARY WASEM,

*Administratrix of said Jacob Wasem, deceased.*

Copies of this patent may be obtained for five cents each, by addressing the "Commissioner of Patents, Washington, D. C."